No. 652,622. Patented June 26, 1900.
R. L. MARSHALL.
WATCH WHEEL GAGE.
(Application filed May 27, 1899.)
(No Model.) 2 Sheets—Sheet 1.
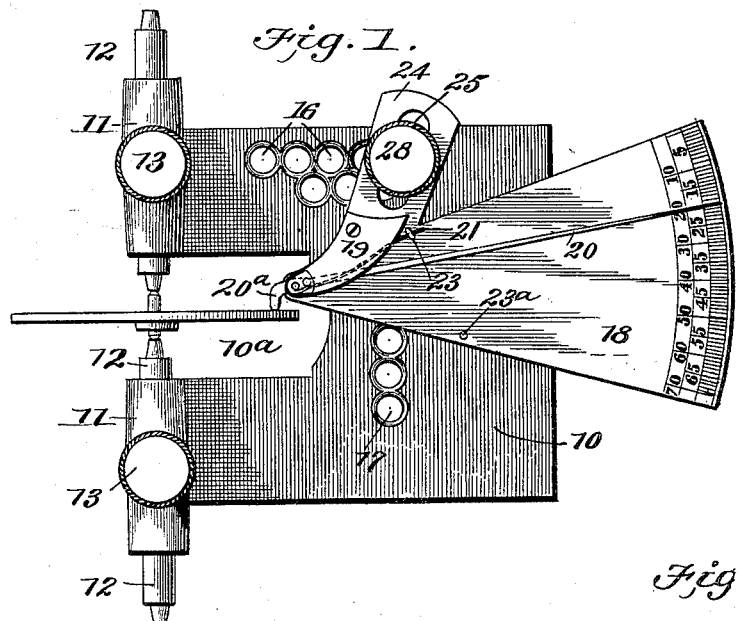
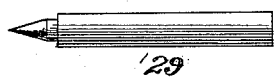
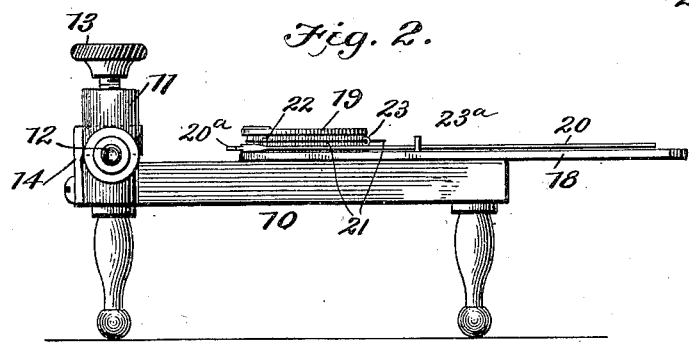
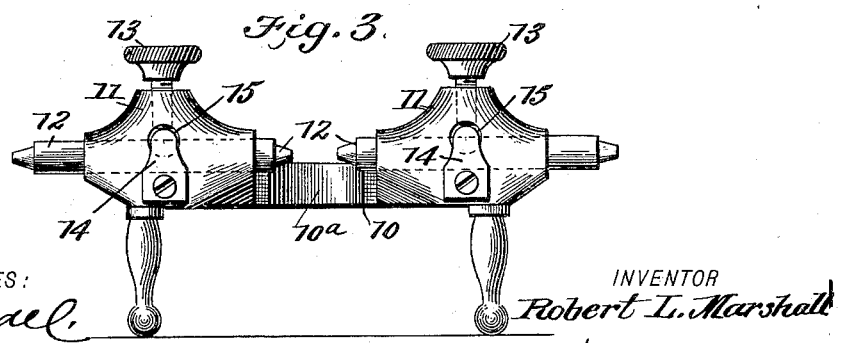
WITNESSES: INVENTOR
Robert L. Marshall
BY
ATTORNEYS.

No. 652,622. Patented June 26, 1900.
R. L. MARSHALL.
WATCH WHEEL GAGE.
(Application filed May 27, 1899.)
(No Model.) 2 Sheets—Sheet 2.
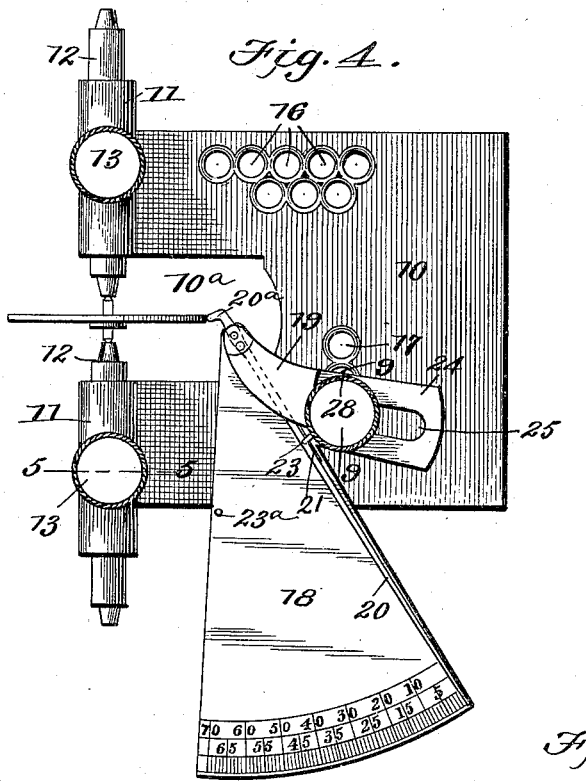
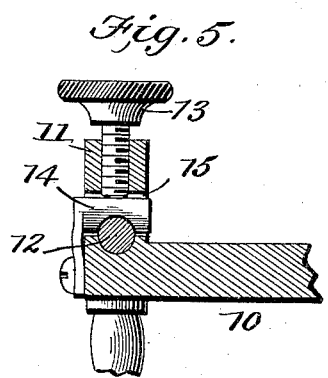
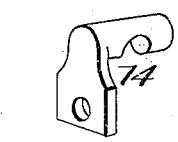
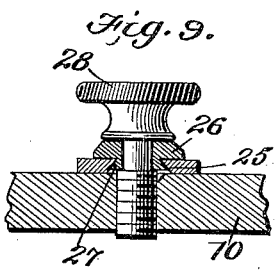
WITNESSES:
INVENTOR
Robert L. Marshall.
BY
ATTORNEYS.

UNITED STATES PATENT OFFICE.

ROBERT L. MARSHALL, OF ELIZABETHTOWN, KENTUCKY.

WATCH-WHEEL GAGE.

SPECIFICATION forming part of Letters Patent No. 652,622, dated June 26, 1900.

Application filed May 27, 1899. Serial No. 718,547. (No model.)

*To all whom it may concern:*

Be it known that I, ROBERT L. MARSHALL, a citizen of the United States, residing at Elizabethtown, in the county of Hardin and State of Kentucky, have invented a new and useful Improvement in Devices for Truing Watch-Wheels, of which the following is a specification.

My invention has for its object a device for accurately determining whether all points on the periphery of a balance or other wheel for watches are equidistant from the center and whether the wheel is exactly true or coincident with the plane in which it is adapted to move.

The invention consists principally in a base on which are mounted means for holding the pivot of a balance-wheel or the like and a graduated plate with a sensitive pointer or indicator arranged to be held at different places on the base, so as to bring the bent end of the pointer in contact with the side and periphery of the wheel.

The invention also consists in certain details of construction and combination of the parts, which I shall first describe, and then point out in the appended claims.

Reference is to be had to the accompanying drawings, forming part of this specification, in which like characters of reference indicate corresponding parts in all the views in which they occur.

Figure 1 is a plan view of my device with parts in position to test the axis of the wheel. Fig. 2 is a side elevation of the same. Fig. 3 is an end view. Fig. 4 is a plan view of the device with parts in position for testing the periphery of a wheel. Fig. 5 is a section on line 5 5, Fig. 4. Fig. 6 is a detail perspective view of a spring-clamp used to bind the centering-pin in place. Fig. 7 is a sectional plan view of the graduated plate, illustrating the manner of attaching a spring to the pointer. Fig. 8 is a section on line 8 8, Fig. 7. Fig. 9 is a detail section on the line 9 9, Fig. 4; and Fig. 10 is a detail view of a modified form of centering-pin.

The base 10 is formed with a recess $10^a$ in its front edge and is provided on each side of said recess with a bearing 11, having longitudinal openings in which centering-pins 12 are adapted to slide. Clamping-screws 13, working in the top of the bearings 11, are adapted to bear down upon one member of spring-clamps 14, which enter openings 15 in the front of the bearings and are recessed on their lower side to fit over the centering-pins 12. The spring-clamps 14 are held in place by screws on the front of the bearings, as shown best in Fig. 3. The base 10 is further provided with two series of screw-threaded openings 16 and 17, of which the series 16 extends along one side edge of the base and preferably comprises eight openings, and the other series 17 extends at right angles to the series 16 and preferably comprises three openings.

In order to determine whether a wheel held between the centering-pins is exactly true, I provide the plate 18, whose rear curved edge is graduated from one to seventy and whose sides converge toward the front, at which point a bearing 19 is mounted on the plate. Within the bearing is set on jeweled pivots a pointer or indicator 20, which is provided with a curved end $20^a$ in advance of its pivot, whereby to form a contact-point and normally kept at the one point of the plate by a hair-spring 21, which is looped around the pivot of the indicator and passes thence around a small pin or projection 22 on the indicator, just in the rear of the pivot-pin, and through an edge 23 on the plate 18, the rear end of the spring being free. An extension 24 is formed on the plate 18 alongside the bearing 19, being secured to or formed integral with the plate, and said extension is formed with a dovetailed elongated slot 25. A collar 26, Fig. 9, is formed with a corresponding annular recess 27, by which it is held to slide in said slot and is prevented from becoming detached therefrom, and a clamping-screw 28 is held to turn in said collar. The screw 28 is adapted to be received into any one of the openings in the base, whereby to hold the plate 18 and the contact-point of the indicator 20 within the recess $10^a$ in the base. $23^a$ indicates a stop-pin to limit the movement of the indicator.

In practical operation a balance-wheel of a watch has its spindle or axis held in the centering-pins, as shown in Fig. 1. The plate 18 is then attached at a suitable point to the base 10, so that the contact-point of indicator will engage with the side face of the wheel, the rear end of the indicator resting at the point "20" on the scale. The balance-wheel is now turned, and if at any point it is not true it will be made apparent by the deviation of the indicator to the right or the left of the point where the indicator first rests. When these discrepancies are discovered by this means, the wheel is bent until the indicator returns to the proper point on the scale.

As shown in Fig. 4, the plate is secured in the series of openings 17 with the contact-point of the indicator held in contact with the periphery of the wheel, and the latter is likewise turned to determine whether all points in the periphery are equidistant from the center.

It will be seen that I have provided a very sensitive and accurate device for the purpose described and one that can be used equally well with different-sized wheels.

As shown in Fig. 10, a centering-pin 29 may be used instead of the centering-pin 12 when the wheel to be tested is formed with an aperture instead of having the pintles secured thereto.

Having thus described my invention, what I claim, and desire to secure by Letters Patent, is—

1. A device for use in truing balance-wheels of watches, comprising a base-plate having two series of apertures extending at angles to each other and a recess in its front edge, a centering-pin adjustably held on the base-plate at each side of said recess, a graduated plate formed with a longitudinally-slotted lateral extension, a clamping-screw slidably held in the slot of the extension and adapted to be received into any one of the apertures in the base, and a spring-pressed indicator pivoted on the graduated plate and having a bent forward end arranged for contact with the watch-wheel, as and for the purpose set forth.

2. A device of the character described, comprising the base formed with a recess in its front edge and a bearing on each side of said recess, a centering-pin in each bearing and adapted to hold a watch-wheel between them, a plate detachably mounted on said base, an indicator on said plate and provided with a projection just in rear of its pivot, a spring having one end secured to the pivot and extending around the projection on the indicator, the free end of the spring passing through an eye on the plate, and means for holding said plate to said base at different points, as set forth.

3. A device of the character described, comprising the base formed with two series of apertures, and a recess in its front edge, means for holding a watch-wheel in said recess, a graduated plate formed with an extension having an undercut slot, a collar having a corresponding recess by which it is held in said slot, a clamping-screw fitted in said collar and adapted to be received into any one of the apertures in the base, and a spring-pressed indicator pivoted on said plate and having a bent forward end arranged to be brought into contact with a watch-wheel, as set forth.

4. A device for the purpose described, comprising a base provided with means for holding a watch-wheel thereon, a graduated plate arranged for attachment to said base, an indicator pivoted on said plate and having a projection in the rear of its pivot, a spring having one end secured to the pivot and extending around the projection on the indicator, the free end of said spring passing loosely through an eye on the plate, and a stop at the edge of the plate opposite the eye, as and for the purpose set forth.

ROBERT L. MARSHALL.

Witnesses:
A. C. LARKIN PERCEFULL,
F. S. STITT.